United States Patent
Dube

(10) Patent No.: US 8,369,503 B2
(45) Date of Patent: Feb. 5, 2013

(54) FALSE ANSWER SUPERVISION MANAGEMENT SYSTEM

(76) Inventor: Chetan Dube, Marlboro, NJ (US)

(*) Notice: Subject to any disclaimer, the term of this patent is extended or adjusted under 35 U.S.C. 154(b) by 873 days.

(21) Appl. No.: 12/504,648

(22) Filed: Jul. 16, 2009

(65) Prior Publication Data

US 2011/0013763 A1  Jan. 20, 2011

(51) Int. Cl.
*H04M 3/00* (2006.01)
(52) U.S. Cl. .......... 379/189; 379/114.14; 379/145
(58) Field of Classification Search .......... 379/114.14, 379/145, 189
See application file for complete search history.

(56) References Cited

U.S. PATENT DOCUMENTS

| | | | |
|---|---|---|---|
| 5,134,651 A | 7/1992 | Ortiz et al. | |
| 5,361,297 A | 11/1994 | Ortiz et al. | |
| 6,111,946 A | 8/2000 | O'Brien | |
| 6,341,960 B1 * | 1/2002 | Frasson et al. | 434/322 |
| 7,324,634 B2 * | 1/2008 | Hoy et al. | 379/133 |
| 7,499,911 B2 * | 3/2009 | Akiyama | 1/1 |
| 2001/0047333 A1 | 11/2001 | Kim et al. | |
| 2007/0008894 A1 * | 1/2007 | Lynch et al. | 370/244 |

* cited by examiner

*Primary Examiner* — Simon Sing
(74) *Attorney, Agent, or Firm* — Ash Tankha; Lipton, Weinberger & Husick

(57) ABSTRACT

A computer implemented method and system is provided for managing false answer supervision (FAS) in a telephony network. A call record recording multiple call events occurring at a terminal gateway is accessed. FAS events originating at the terminal gateway are detected. Suspect illegitimate call events are analyzed based on a combination of conditions. The suspect illegitimate call events are filtered for detecting events suspected of FAS. The FAS events are confirmed after discounting the suspected FAS events based on whether a proportion of the suspected FAS events is within a FAS threshold. A statistical inference of current behavior and past behavior of the terminal gateway is inferred. Threshold values are established for acceptable number of FAS events. A non-compliant behavior of the terminal gateway is inferred when the FAS events exceed the established threshold values. A service provider associated with the terminal gateway is notified for remedying the non-compliant behavior.

22 Claims, 11 Drawing Sheets

| Sl. No. | Answer Signal Premature / Legitimate | Call is Answered / Not Answered (Ring, Busy, Out-of-Order) | Conversation Long / Short (Legitimate – VM/AA/IVR/fax/manual, Illegitimate-Poor voice / disconnects) | Billing Correct / Overbilled | Importance |
|---|---|---|---|---|---|
| 1 | Premature | Answered | Long | Correct | X |
| 2 | Premature | Answered | Long | Overbilled | X |
| 3 | Premature | Answered | Short – Legitimate | Correct | X |
| 4 | Premature | Answered | Short – Legitimate | Overbilled | X |
| 5 | Premature | Answered | Short – Illegitimate | Correct | X |
| 6 | Premature | Answered | Short – Illegitimate | Overbilled | ✓ |
| 7 | Premature | Not Answered | N/A | Correct | X |
| 8 | Premature | Not Answered | N/A | Overbilled | ✓ |
| 9 | Legitimate | Answered | Long | Correct | ✓ |
| 10 | Legitimate | Answered | Long | Overbilled | X |
| 11 | Legitimate | Answered | Short – Legitimate | Correct | ✓ |
| 12 | Legitimate | Answered | Short – Legitimate | Overbilled | X |
| 13 | Legitimate | Answered | Short – Illegitimate | Correct | ✓ |
| 14 | Legitimate | Answered | Short – Illegitimate | Overbilled | ✓ |
| 15 | Legitimate | Not Answered | N/A | Correct | ✓ |
| 16 | Legitimate | Not Answered | N/A | Overbilled | X |

FIG. 4

FALSE ANSWER SUPERVISION MANAGEMENT SYSTEM

BACKGROUND

The computer implemented method and system disclosed herein, in general, relates to answer supervision in a switched telephony network. More particularly, the computer implemented method and system disclosed herein relates to detection and remediation of false answer supervision (FAS) in a switched telephony network, specifically in a voice over internet protocol (VoIP) network.

False answer supervision (FAS) occurs when the telephony switch for the called party sends an answer signal although the called party has not answered. The FAS behavior by the switch bills the calling party incorrectly. For the VoIP industry, the widespread issue of FAS results in a loss of millions of dollars in revenue, dents profit margins, and damages relationship with customers.

Consider the occurrence of false answer supervision (FAS) in a VoIP call between peer gateways. The switch for a VoIP network is commonly known as VoIP gateway, or simply gateway in the context of VoIP network. The calling party uses an originating gateway to originate the call, and the called party receives the call via a terminal gateway. The originating gateway signals to the terminal gateway to setup a call. However, the terminal gateway responds with an answer signal before the call is answered, incorrectly billing the calling party because the originating gateway, on reception of the answer signal, assumes that the call has been answered and starts the billing meter for the duration of the call. Occasionally, the violation is more severe. For instance, the terminal gateway responds to the originating gateway with an answer signal, starts the billing, establishes the call to the called party via public switched telephony network (PSTN), finds that the called party is busy, and plays the busy tone, while the calling party is billed for an incomplete call.

False answer supervision (FAS) may be unintentional; for example, the downstream telephony service provider issues a false answer signal that the terminal gateway relays further to the originating gateway, or is malicious, for example, when the call is billed irrespective of whether the called party answers the call or not. If the call is answered by the called party and a successful conversation follows, the premature answer signal, i.e., answer issued prior to the called party going off-hook, may be tolerated. However, if the call is not answered due to the called party being busy or unavailable, billing such a call is a severe offense. The originating gateway's subscriber, the calling party, may detect this in the bill and demand cancellation of the charge. Billing prematurely answered calls may also result in loss of goodwill that can adversely impact the business for the originating gateway's service provider. It is in the interest of the originating gateway's service provider to vigorously pursue the matter of FAS with the service provider for the terminal gateway. The penalties imposed on the service provider for the terminal gateway may result in removal of the service provider from the routing table, leading to loss of voice traffic and revenues. When the consequences can be so severe and the adverse business impacts so grave, there is a need to detect FAS accurately.

Several attempts have been made by gateway vendors to detect false answer supervision (FAS), such as, detection of reverse polarity, timing since the last dialed digit, and detection and analysis of tones. The method of detecting reverse polarity applies to analog circuits and is not implemented in modern digital telephony circuits. The method is not suitable for cases where the gateways are configured to issue answer signal without the reception of reverse polarity. The method employing timing since the last digit is dialed, although to some extent successful, requires complex logic and remains plagued by false answer detection, or no detection when a call is in fact answered. These errors result in erroneous charges or no charges, and are a consequence of inexact answer supervision. Another method employs detection and analysis of tones using an apparatus that provides answer supervision to privately owned pay telephone equipment. The apparatus includes a microprocessor for analyzing tones received by the calling telephone while waiting for the called telephone to answer. This method provides complex tone analysis to distinguish between an answered call and noise caused by signals such as a busy signal. However, the implementation does not accurately detect false answer on all instances. Therefore, there is a need to achieve answer supervision without relying on circuitry that detects an answer by analyzing tones, waveforms, and noise on a transmission line to detect when a call is completed.

The current methods are only compatible with selected vendors and trunking interfaces of selected postal telephone and telegraph services (PTTs). Additionally, the methods discussed above are focused narrowly on false answer supervision (FAS), without regard to poor voice or audio quality calls, which similar to FAS, are another type of illegitimate calls. Hence, there is a need for a computer implemented method and system that detects FAS that is broadly compatible and does not falsely declare other types of illegitimate calls as FAS.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for detecting false answer supervision (FAS) in a broadly compatible manner by managing FAS in a telephony network based on a standard. The method and system disclosed herein also avoids falsely declaring other types of illegitimate calls as FAS. A call record recording multiple call events occurring at a terminal gateway is accessed. The terminal gateway serves a called device in a given destination within the telephony network. FAS call events originating at the terminal gateway are detected. Suspect illegitimate call events are analyzed from the call events based on a combination of multiple conditions associated with call initiation, call disposition, call duration, and call billing events. The suspect illegitimate call events that are analyzed comprise FAS call events and poor audio quality call events. The suspect illegitimate call events are filtered for detecting events suspected of FAS based on measured call answer delay and measured call hold time of the suspect illegitimate call events.

The suspect illegitimate call events are filtered for detecting the false answer supervision (FAS) call events by comparing the call answer delay with preconfigured lower values and upper values of a ring back indication threshold. The call answer delay is a time interval between last digit dialed on a calling device for placing a call and the call being answered at a called device. The call hold time is the duration for which the calling and the called parties conversed. The call hold time is compared with a low time value for filtering the suspect illegitimate call events that were answered manually in a quick manner. Poor audio quality call events are declared based on the call hold time and a mean opinion score for the suspect illegitimate call events.

The false answer supervision (FAS) call events are confirmed after discounting the suspected FAS call events based on whether a proportion of the suspected FAS call events is within a FAS threshold. The FAS threshold is determined based on expected characteristics of the terminal gateway and the destination, and is configurable. A statistical inference of current behavior and past behavior of the terminal gateway over predetermined periods of time is derived. Multiple threshold values are established for acceptable number of events that resemble FAS over the predetermined periods of time. A non-compliant behavior of the terminal gateway is inferred based on whether the FAS call events over the predetermined periods of time exceed the established threshold values consistently over a predetermined duration. A service provider or carrier associated with the terminal gateway is notified of the non-compliant behavior for remedying the non-compliant behavior.

The predetermined periods of time considered for inferring the false answer supervision (FAS) calls for a terminal gateway correspond to predetermined compute intervals. The proportion of suspected FAS call events is computed over the predetermined compute intervals. The frequency of FAS over the predetermined periods of time is computed for the predetermined duration.

The computer implemented method and system disclosed herein provides a chaining mechanism between multiple carriers lying on the route between the originating gateway and the terminal gateway to single out the false answer supervision (FAS) source in the destination. The chaining mechanism chains the detection and remediation across carriers, and results in a mechanism for isolating the terminal gateway of a service provider that originates FAS or is the source of FAS. Punitive measures against the source of FAS can be undertaken to provide for an effective FAS deterrent.

The non-compliant behavior is remedied by short term and long term remediation measures. The short term remediation measures consider false answer supervision (FAS) proportion of a current service level metric interval and a history of FAS proportions of previous service level metric intervals to penalize the service provider for FAS. The long term remediation measures are employed for sustaining compliant behavior of the service provider.

The computer implemented method and system disclosed herein provides a feature-rich solution, with multiple mechanisms to detect and remediate not only false answer supervision (FAS), but poor voice or audio quality calls as well. The comprehensive solution sets and monitors the characteristics for the calls. The solution is relaxed to detect FAS call events, and yet robust to not erroneously flag answered calls as FAS. The solution analyzes the dial control management information base (MIB) information about each call, obtained by either polling from the gateway using protocol such as simple network management protocol (SNMP) or by building an interface to a service provider's mediation engine that contains this information. The solution is cost-effective and has distributed architecture to scale for VoIP service providers and large enterprises. The solution detects false billing and saves significant operational expense for VoIP.

The computer implemented method and system disclosed herein provides a false answer supervision (FAS) solution that detects FAS comprehensively and accurately, that is, the legitimate calls are not falsely implicated as FAS. This comprehensiveness and accuracy are key success factors with both, enterprise customers and VoIP service providers. The solution can scale to process millions of records during the busy hour, which is a requisite for large enterprises and VoIP service providers. The proprietary algorithm uses statistical inference to automate the detection of FAS call events. The solution detects and remediates FAS in real-time from a feed of millions of call records for the busy hour.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 4 exemplarily illustrates a table of conditions used for detection of false answer supervision.

DETAILED DESCRIPTION OF THE INVENTION

In a voice over internet protocol (VoIP) call between peer gateways, an originating gateway (OGW) signals a call to a terminal gateway (TGW). The terminal gateway may falsely return an answer signal to the originating gateway. The computer implemented method disclosed herein detects false answer supervision (FAS) accurately to minimize false charges that can damage credibility and dent business revenues and margins.

Figure 1:
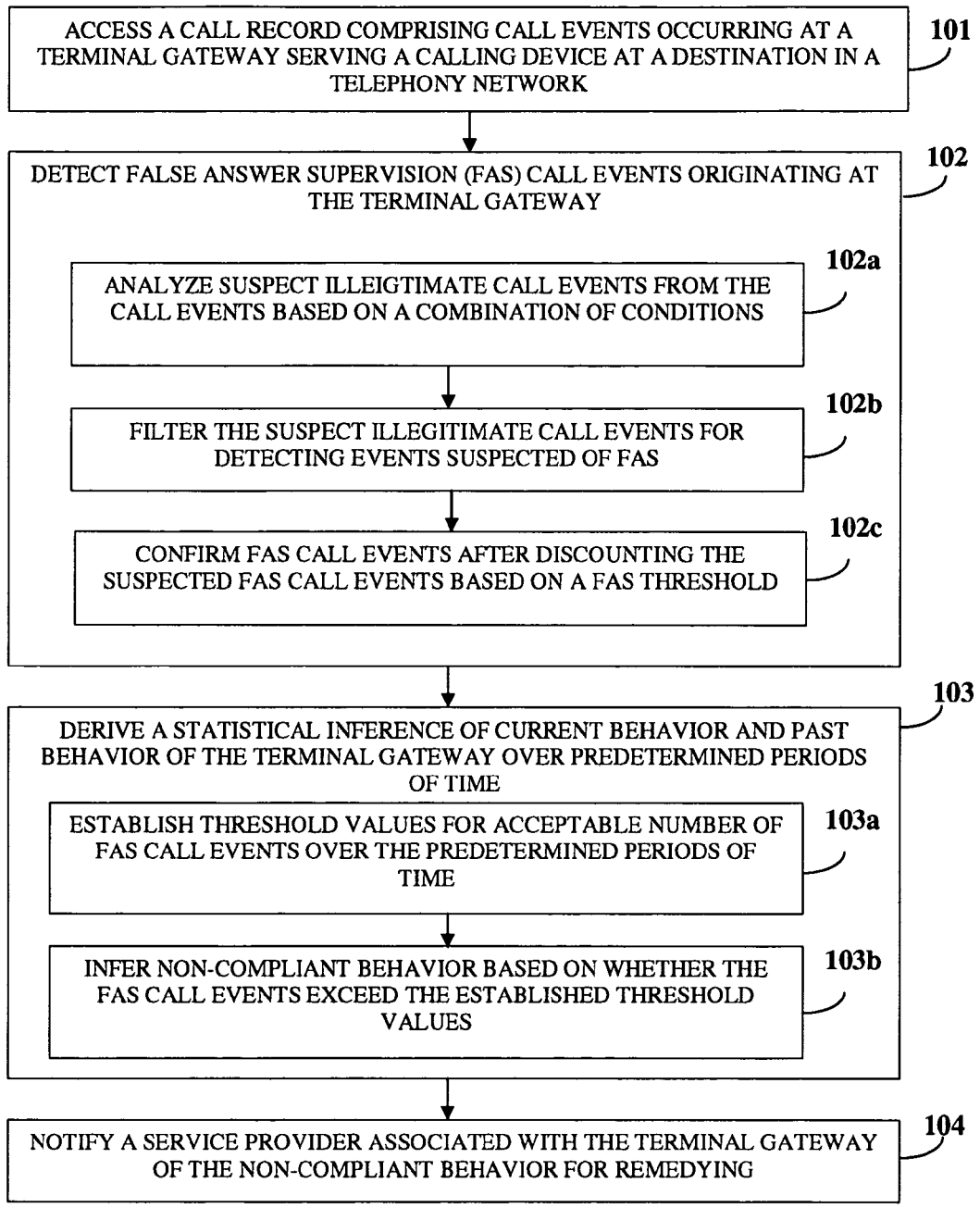
FIG. 1 illustrates a computer implemented method for managing false answer supervision in a telephony network.
Figure 2:
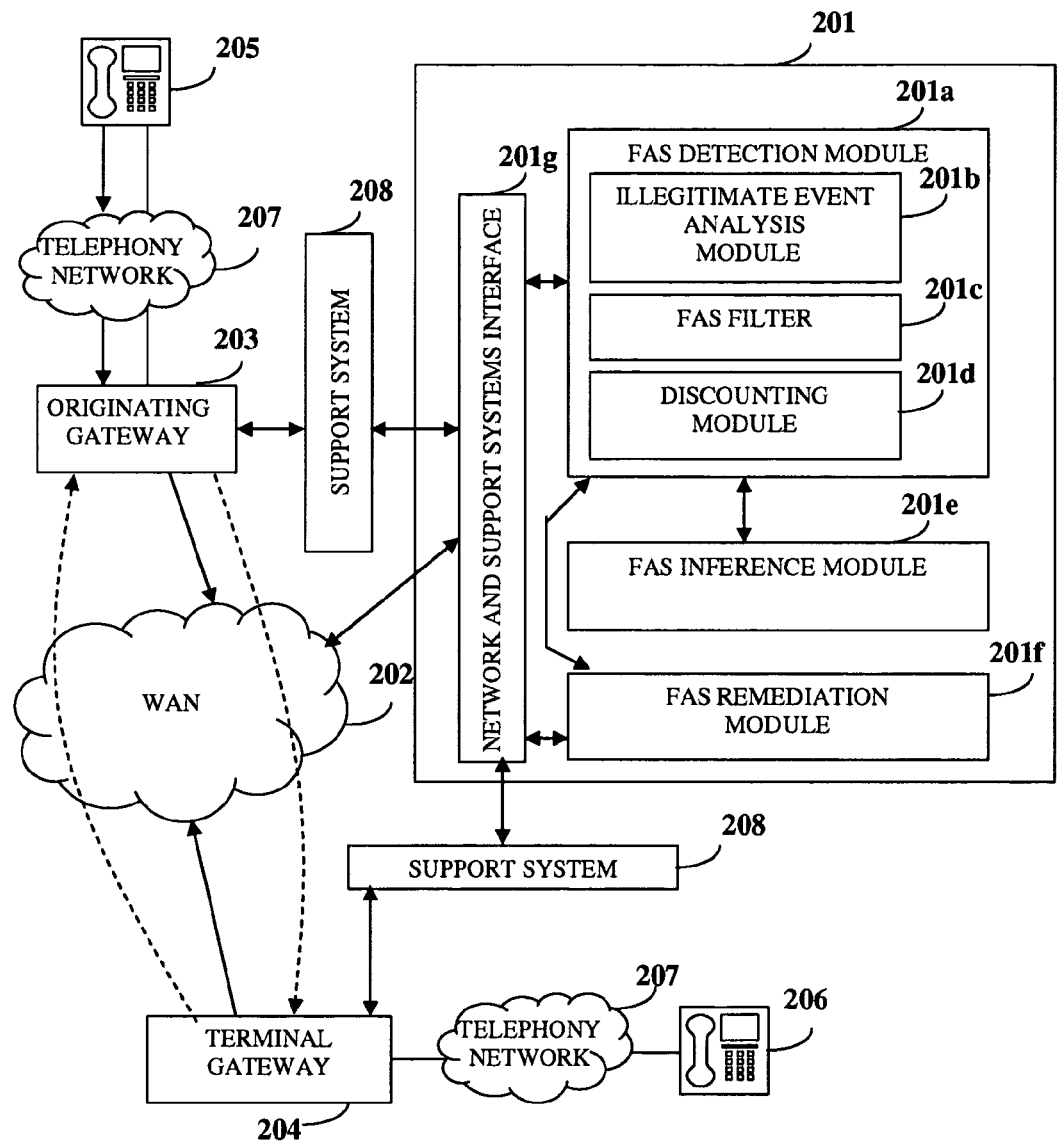
FIG. 2 illustrates a computer implemented system for managing false answer supervision in a telephony network.

FIG. 1 illustrates the computer implemented method for managing false answer supervision (FAS) in a telephony network 207. The telephony network 207 connects to a digital public or private wide area network, for example, a VoIP network. A call record recording multiple call events occurring at the terminal gateway 204 is accessed 101. The terminal gateway 204 serves a called device 206 in a given destination within the telephony network 207 as illustrated in FIG. 2. As used herein, a destination is a logical grouping of called devices, usually within the same geographical area. An example of a destination could be Baltimore-Mobile that refers to mobile terminations in greater Baltimore area. Another example of destination could be Washington DC-Metro that refers to landline destinations in the metropolitan area of Washington DC. FAS call events originating at the terminal gateway 204 in the telephony network 207 are detected 102. Suspect illegitimate call events are analyzed 102a from the call events based on a combination of multiple conditions associated with call initiation, call disposition, call duration, and call billing events. The suspect illegitimate call events that are analyzed comprise FAS call events and poor audio quality call events. The suspect illegitimate call events are filtered 102b for detecting call events suspected of FAS, based on measured call answer delay (CAD) and measured call hold time (CHT) of the suspect illegitimate call events. As used herein, call answer delay (CAD) is the time difference between when a gateway receives a call to when the called party answers, i.e., the CAD is a time interval between last digit dialed on a calling device 205 for placing a call and the call being answered at the called device 206. Mathematically, CAD is equal to the difference between connect time and setup time. As used herein, call hold time (CHT) for a call is the duration for which the calling and called parties conversed. Mathematically, call hold time is equal to the difference between disconnect time and connect time. The CAD is compared with preconfigured lower values of a ring back indication threshold for detecting the suspected FAS call events. The CAD is evaluated against a wider test and is also compared with preconfigured upper values of the ring back indication threshold for detecting the suspected false answer supervision call events. The ring back indication threshold values are based on the typical minimum delay for ring back indication for a destination. The CHT is compared with a low time value for filtering the suspect illegitimate call events answered manually but quickly.

The FAS call events are confirmed 102c after discounting the suspect FAS call events based on whether a proportion of the suspected FAS call events is within a FAS threshold. The FAS threshold is determined based on expected characteristics of the destination, and is either configured by a user or auto-learnt by the system 201 from training data. As used herein, the user is an operations personnel, employed by a telecom or a service provider, who uses the computer implemented method and system 201 disclosed herein to detect and remediate FAS. As used herein, the FAS threshold is based on the proportion of calls that are expected to have low CAD and low CHT, since many calls answered by auto-answering systems in the destination characteristically have low CAD and low CHT. A statistical inference of current behavior and past behavior of the terminal gateway 204 over many predetermined periods of time is derived 103. Multiple threshold values are established 103a for acceptable number of events that resemble FAS over the many predetermined periods of time. A non-compliant behavior of the terminal gateway 204 is inferred 103b based on whether the FAS call events over the many predetermined periods of time exceed the established threshold values, for example, consistently over a predetermined duration. A service provider associated with the terminal gateway 204 is notified 104 of the non-compliant behavior for remedying the non-compliant behavior.

The computer implemented method disclosed herein constructs a solution based on a standard. Gateway vendors implement the internet engineering task force (IETF) standard, dial control management information base (MIB), RFC 2128, for multiple trunking interfaces. The MIB is used to derive important parameters about the characteristics of each call. A proprietary algorithm processes these characteristics to determine whether the call is false answer supervision (FAS). The algorithm to detect FAS considers the geographical location of the terminal gateway 204, the call events recorded in the call record (the Dial Control MIB), and the statistical inference of the behavior of the terminal gateway 204 with respect to FAS from two perspectives, namely, the present behavior and the past behavior. Each call record is processed through the algorithm to classify the call as FAS or not FAS. There are instances when the call is not FAS, but suffers from poor voice or audio quality. This call is also illegitimate and is flagged as illegitimate. If a call is neither FAS nor does the call suffer from poor voice or audio quality, the call is considered a legitimate call.

In an embodiment, the service provider associated with the terminal gateway 204 is notified after detecting either false answer supervision (FAS) or poor audio quality type illegitimate calls. If the illegitimate call is due to FAS, the service provider for terminal gateway 204, that originates the false answer signal, is informed of the incorrect behavior, and if the behavior persists, is penalized. An algorithm to remediate FAS considers several options. For instance, the service provider is penalized if a percentage of FAS call events to the terminal gateway 204 exceeds a minimum threshold, especially if the service provider has FAS-prone history. In another instance, certain critical service providers or carriers are exempted from penalty even if they exceed the threshold. Depending on the severity of the violation, either a warning is sent to the service provider for the terminal gateway 204 or the terminal gateway 204 is removed from the route to stop sending VoIP traffic over the terminal gateway 204. The data about the terminal gateways may be mined to classify service providers that routinely commit FAS violation to penalize them.

The computer implemented method disclosed herein further enables chaining the detection and the remediation across service providers to isolate the terminal gateway 204 of the service provider that originates the false answer supervision (FAS).

FIG. 2 illustrates a computer implemented system 201 for managing false answer supervision (FAS) in a telephony network 207. The computer implemented system 201 is herein referred to as an "FAS management system". The telephony network 207 is, for example, an analog telephony network and connects to a digital public or private wide area network (WAN) 202, for example, a VoIP network. The telephony network 207 connects the gateways 203 and 204 to the calling device 205 and the called device 206. The telephony network 207 has IP trunks that establish calls via standard protocols, for example, H.323 or SIP. The telephony network 207 also has traditional dedicated trunks that establish calls over analog trunks, using for example loop start, or digital trunks, using for example ISDN primary rate interface (PRI). The originating gateway (OGW) 203 serving a calling device 205 signals a call to the terminal gateway (TGW) 204. The terminal gateway 204 may falsely return an answer signal to the originating gateway 203. The FAS management system 201 detects and remediates FAS call events originating at the terminal gateway 204 serving a called device 206 at a destination in the telephony network 207. The FAS management system 201 comprises a network and support systems interface 201g, a FAS detection module 201a, a FAS inference module 201e, and a FAS remediation module 201f.

The network and support systems interface 201g accesses the call record comprising multiple call events occurring at the terminal gateway 204. The call records are accessed from the originating gateway 203 and/or the terminal gateway 204, or from the support systems 208 that maintain routing and/or billing for the gateways 203 and 204. The FAS detection module 201a detects the FAS call events. The FAS detection module 201a comprises an illegitimate event analysis module 201b, a FAS filter 201c, and a discounting module 201d.

The illegitimate event analysis module 201b analyzes suspect illegitimate call events based on a combination of multiple conditions associated with call initiation, call disposition, call duration, and call billing events. The suspect illegitimate call events that are analyzed comprise false answer supervision (FAS) call events and poor audio quality call events. The FAS filter 201c filters suspect illegitimate call events for detecting events suspected of FAS, based on call answer delay and call hold time. The discounting module 201d discounts the suspected FAS call events based on whether a proportion of the suspected FAS call events is within a FAS threshold. The FAS threshold is determined based on expected characteristics of the called destination and the terminal gateway 204. The discounting module 201d establishes the FAS threshold for comparing the proportion of call events that are expected to have low call answer delay and low call hold time in the terminal gateway 204 and the destination to discount the suspected FAS events. The FAS threshold is used for FAS detection.

The false answer supervision (FAS) detection module 201a compares the call answer delay (CAD) with preconfigured lower values of the ring back indication threshold for detecting the suspected FAS call events. The FAS detection module 201a evaluates the CAD against a wider test by comparing the CAD with preconfigured upper values of the ring back indication threshold for detecting the suspected FAS call events. The FAS detection module 201a compares the call hold time (CHT) with a low time value for filtering the suspect illegitimate call events answered manually but quickly. The FAS detection module 201a computes the proportion of the suspected FAS call events over multiple predetermined compute intervals. The FAS detection module 201a computes frequency of the FAS over the predetermined periods of time for the predetermined duration, wherein the predetermined periods of time correspond to the predetermined compute intervals. The FAS detection module 201a declares poor audio quality call events based on the CHT and a mean opinion score for the suspect illegitimate call events.

The FAS inference module 201e derives a statistical inference of current behavior and past behavior of the terminal gateway 204 over predetermined periods of time. The FAS inference module 201e defines FAS-ratios, for acceptable number of the false answer supervision (FAS) call events over the predetermined periods of time. As used herein, FAS-ratios are the threshold values established for an acceptable number of FAS events over the multiple predetermined periods of time. The FAS-ratio is the threshold set for remediation after inferring which calls are FAS over the predetermined periods of time. On the other hand, the FAS threshold is set for detecting FAS calls in each predetermined period.

The FAS remediation module 201f infers a non-compliant behavior of the terminal gateway 204 based on whether the detected FAS call events over the predetermined periods of service level metrics time exceed the FAS-ratio values consistently over a predetermined duration. The FAS remediation module 201f notifies and removes from route a service provider associated with the terminal gateway 204 of the non-compliant behavior for remedying the non-compliant behavior and implementing remediation measures, for example, taking punitive actions against the service provider or carrier. The network and support systems interface 201g also returns remediation events to the telephony network 207 or the support systems 208 for routing for remedying non-compliant behavior.

Figure 3:
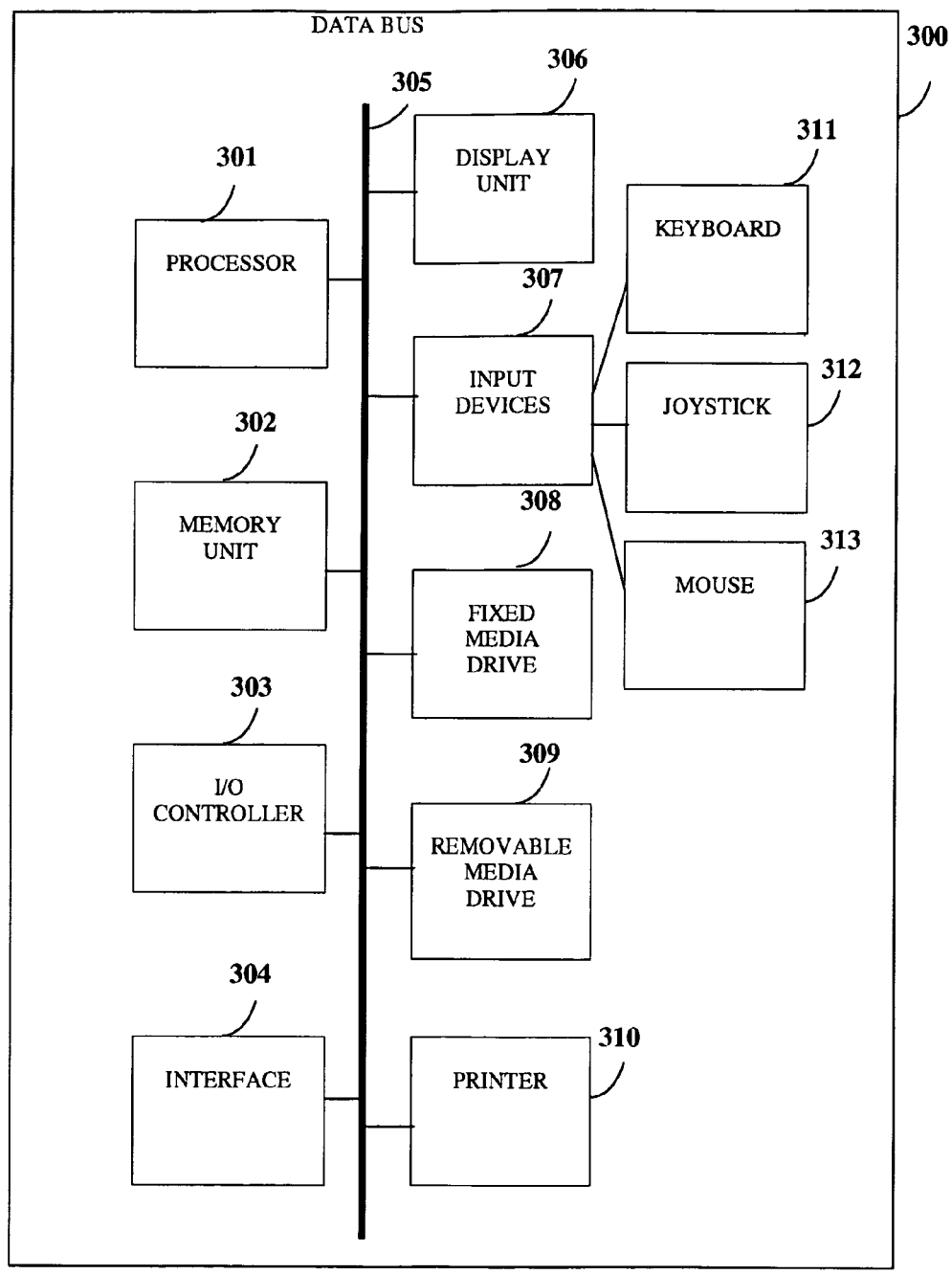
FIG. 3 exemplarily illustrates a computer system architecture employed by the false answer supervision management system.

FIG. 3 exemplarily illustrates a computer system architecture employed by the FAS management system 201. The computer implemented system 201 explained in the detailed description of FIG. 2 is herein referred to as the FAS management system 201. The computer system 300 executes the instructions sent by the modules 201a, 201b, 201c, 201d, 201e, and 201f of the FAS management system 201. The computer system 300 comprises a processor 301, a memory unit 302 for storing programs and data, an input/output (I/O) controller 303, an interface 304, and a display unit 306 communicating via a data bus 305. The memory unit 302 comprises a random access memory (RAM) and a read only memory (ROM). The computer system 300 further comprises one or more input devices 307, for example, a keyboard 311 such as an alphanumeric keyboard, a mouse 313, a joystick 312, a touch-sensitive screen, etc. The computer system 300 communicates with other computer systems through the interface 304, comprising, for example, a Bluetooth® interface, an infrared (IR) interface, a WiFi interface, a universal serial bus interface (USB), a local area network (LAN) or wide area network (WAN) interface such as the network and support systems interface 201g, etc.

The computer system 300 further comprises a fixed media drive 308 and a removable media drive 309 for receiving removable media. The computer system 300 further comprises output devices, for example, a printer 310 for receiving and reading digital data on a compact disk, a digital video disk or other medium. Computer applications or programs are used for operating the computer system 300. The programs are loaded onto the fixed media drive 308 and into the memory unit 302 of the computer system 300 via the removable media drive 309. Applications are executed by double clicking a related icon or menu displayed on the display unit 306 using the mouse 313 or through other input devices 307. Further the computer system 300 employs an operating system for performing multiple tasks. The operating system manages execution of the FAS detection module 201a and other modules 201b, 201c, 201d, 201e, and 201f of the FAS management system 201. The operating system further manages security of the computer system 300, peripheral devices connected to the computer system 300, and network connections. The operating system recognizes keyboard inputs and pointing device inputs of a user, output display, files and directories stored locally on the fixed media drive 308. Different programs, for example, web browser, e-mail application, etc. initiated by the viewer are executed by the operating system with the help of the processor 301, for example, a central processing unit (CPU). The operating system monitors the use of the processor 301.

The instructions from the FAS detection module 201a are stored in the memory unit 302. The call record is transferred from the gateways 203 and 204 to the FAS detection module 201a through the interface 304 and via the WAN 202. A user initiates the execution of the FAS detection module 201a by running an executable file for the FAS detection module 201a on the display unit 306 or the execution of the FAS detection module 201a is automatically initiated on transmitting the call record to the FAS detection module 201a. The CPU retrieves instructions for executing the FAS detection module 201a from the modules, for example, the illegitimate event analysis module 201b, the FAS filter 201c, and the discounting module 201d in the FAS detection module 201a. The locations of the instructions in the modules 201a, 201b, 201c, 201d, 201e, and 201f are determined by a program counter (PC). The program counter stores a number that identifies the current position in the program of the FAS detection module 201a. The instructions fetched by the CPU from the program memory after being processed are decoded. The instructions are placed in an instruction register (IR) in the CPU. After processing and decoding, the CPU executes the instructions. The instructions comprise, for example, detecting the FAS call events from the call events, deriving a statistical inference of current behavior and past behavior of the terminal gateway

204, etc. At the time of execution, the instructions stored in the instruction register are examined to determine the operations to be performed. The specified operation is then performed by the CPU. The operations include arithmetic and logic operations.

The operating system performs multiple routines for performing a number of tasks required to assign input devices 307, output devices, and memory for execution of the FAS detection module 201a. The tasks performed by the operating system comprise assigning memory to the FAS detection module 201a and data, moving data between memory and disk units and handling input/output operations. The operating system performs the tasks on request by the operations and after performing the tasks, the operating system transfers the execution control back to the CPU. The CPU continues the execution to obtain one or more outputs. The outputs of the execution of the FAS detection module 201a are displayed to the user on the display unit 306.

The FAS detection module 201a implements an algorithm to detect false answer supervision (FAS). In order to derive the algorithm to detect FAS calls, several requirements that drive FAS have to be investigated. The algorithm considers several call parameters as input to the algorithm. These parameters are derived from the dial control management information base (MIB) retrieved from each VoIP gateway. The dial control MIB contains information that telephony switches traditionally store in call detail record. The information in the dial control MIB is standard, implemented by all gateway vendors, and in line with requirement to build an algorithm that ensures consistency and is broadly applicable. FIG. 4 exemplarily illustrates a table of conditions used for detection of FAS. The parameters comprise, for example, answer signal, call's disposition, duration of the call, billing, and importance to the algorithm.

The answer signal is either premature or legitimate. The answer signal is sent by the terminal gateway 204 when the called party answers, i.e. goes off-hook. The answer signal in this case is legitimate. The terminal gateway 204 may also send an answer signal prematurely, that is, even when the called party has not answered. The corresponding answer signal is considered premature. The call's disposition comprises two values, namely, answered or unanswered. The call is answered by the called party when the called device 206 goes off-hook. However, sometimes the call is unanswered because the called party is unavailable, for example, the phone rings with no answer, the called party is busy, for example, engaged in another conversation, or the telephony network 207 or the called device 206 is out-of-order.

The duration of the call is either long or short. A short conversation can be legitimate with an auto-answering system like voice mail (VM), auto-attendant (AA), interactive voice response (IVR), or even a person. A short conversation can be illegitimate also, primarily because of poor voice quality or disrupted connection. Long conversations indicate conversation that the parties comprehend. Short duration can be legitimate, typically with auto-answering systems, or illegitimate. The billing is classified as correct or over billed. If the call is declared false answer supervision (FAS), the calling party can be over billed; otherwise the calling party is billed correctly.

The importance of a call is from a requirement perspective for the algorithm, where the call is classified as important or unimportant. Important calls are those that must be correctly classified by the algorithm as illegitimate, including false answer supervision (FAS) and poor audio quality type calls, or legitimate. For example, cases that occur frequently, such as cases that cause most FAS call events are important, and are captured. Also, cases that have offensive behavior are important because of inappropriateness of the charge, leading to subscriber complaining to resolve and loss of goodwill. Also, cases that can lead to false positive are important, for example, cases that can lead to falsely declaring a legitimate call as FAS. Most of the calls are legitimate calls. If a small fraction of these are incorrectly declared FAS, a large number of calls will be incorrectly implicated as FAS. Considerable resource and time is wasted chasing down these false leads. Those responsible for tracking FAS will be more careful before implicating an innocent service provider as non-compliant. Careful investigation would require considerable effort, most likely manual, stretch the time to detect FAS, and prohibit real-time detection of FAS. Hence, the algorithm is careful to avoid false positives. The remaining calls are designated as unimportant from a requirement perspective for the algorithm. Each of the parameters, such as, answer signal, call's disposition, duration of the call, and billing can be assigned various values. For any particular combination of the assigned values, the call type is deemed as important or unimportant. If a call type is important, the call type must be correctly classified by the algorithm, as these call types impose requirements on the algorithm.

Referring to FIG. 4, the combinations of the assigned values for important and unimportant call types are enumerated in the table. Considering each row of the table, the first 2 rows enumerate calls that are prematurely answered (FAS) but have long conversations. Irrespective of whether these calls are billed correctly or over billed by a minute, they are considered unimportant since the charge is not highly inappropriate. On the same basis, call types in the next 2 rows, serial numbered "3" and "4", are also classified as unimportant. The call type 4 is unimportant because the frequency of occurrence of this type is low. For an answered call where conversation lasted for a couple of minutes, the extra seconds added to the call hold time due to FAS is unlikely to push the call over to the next minute for billing. The fifth row, serial numbered "5" is unimportant because the calling party could not comprehend the conversation, hung up, complained for refund, and was granted refund. Hence, the unsuccessful call is not charged.

The sixth row, serial numbered "6" is important. The calling party could not comprehend the conversation, hung up, complained regarding a refund, and was granted a refund. However, the premature answer signal, i.e. false answer supervision (FAS), billed the party for 2 minutes. Even with a minute's refund, the calling party was still billed for a minute, making the calling party pay for a poor voice call. The inappropriateness of the charge labels this call type to be important, even if this call type does not occur frequently. The combination in the seventh row, serial numbered "7" is very unlikely to occur. The calling party does not request refund for calls that have not connected. Nevertheless, it did, and since there was no inappropriate charge for the call, the call type is unimportant.

The eighth row, serial numbered "8" is important. The calling party did not connect, and therefore did not request refund though the calling party was billed due to false answer supervision (FAS). The charge here is highly inappropriate because the calling party is billed for listening to ring back tone, busy tone, or a network announcement. This situation can occur frequently, and the algorithm must detect FAS for this call type. The ninth row, serial numbered "9" is also important. This call type is the most frequent, and represents a situation where a legitimate call is answered, with a long duration and correct billing. This call type must not be falsely detected by the algorithm as FAS, lest the operations personnel spend numerous hours chasing down leads only to discover that the system 201 accused and penalized the service provider incorrectly.

The tenth row, serial numbered "10" cannot occur. A call that is answered legitimately cannot over bill the subscriber if the voice or audio quality is good. Hence, this call type is unimportant. The eleventh row, serial numbered "11" though is important. This call type is frequent, and represents a case where a legitimate call is answered, with a short duration, that is typical of auto-answered calls using, for example voice mail (VM), and correct billing. This call type must not be falsely detected by the algorithm as false answer supervision (FAS), lest the operations personnel spend numerous hours chasing down leads only to discover that the system 201 accused and penalized the service provider incorrectly.

The twelfth row, serial numbered "12" cannot occur. A call that is answered legitimately cannot over bill the subscriber if the voice or audio quality is good. Hence, this call type is unimportant. Call types represented in rows 13 and 14 are legitimately answered. These call types should not be falsely classified as false answer supervision (FAS), irrespective of whether they were billed correctly or not. These call types are important to ensure that the algorithm does not incorrectly classify them as FAS, but correctly recognize them as illegitimate due to poor voice or audio quality. The call type in row 15 should not be incorrectly classified by the algorithm as FAS. The call type in row 15 is a frequent call type and must not be classified as FAS, lest the operations personnel spend numerous hours chasing down leads only to discover that the system 201 accused and penalized the service provider incorrectly. The call type in row 16 cannot occur. A call that is not answered but is legitimate and does not generate false answer signal cannot bill the called party. Hence, this call type cannot over bill. Therefore, call type 16 is unimportant.

Figure 5A:
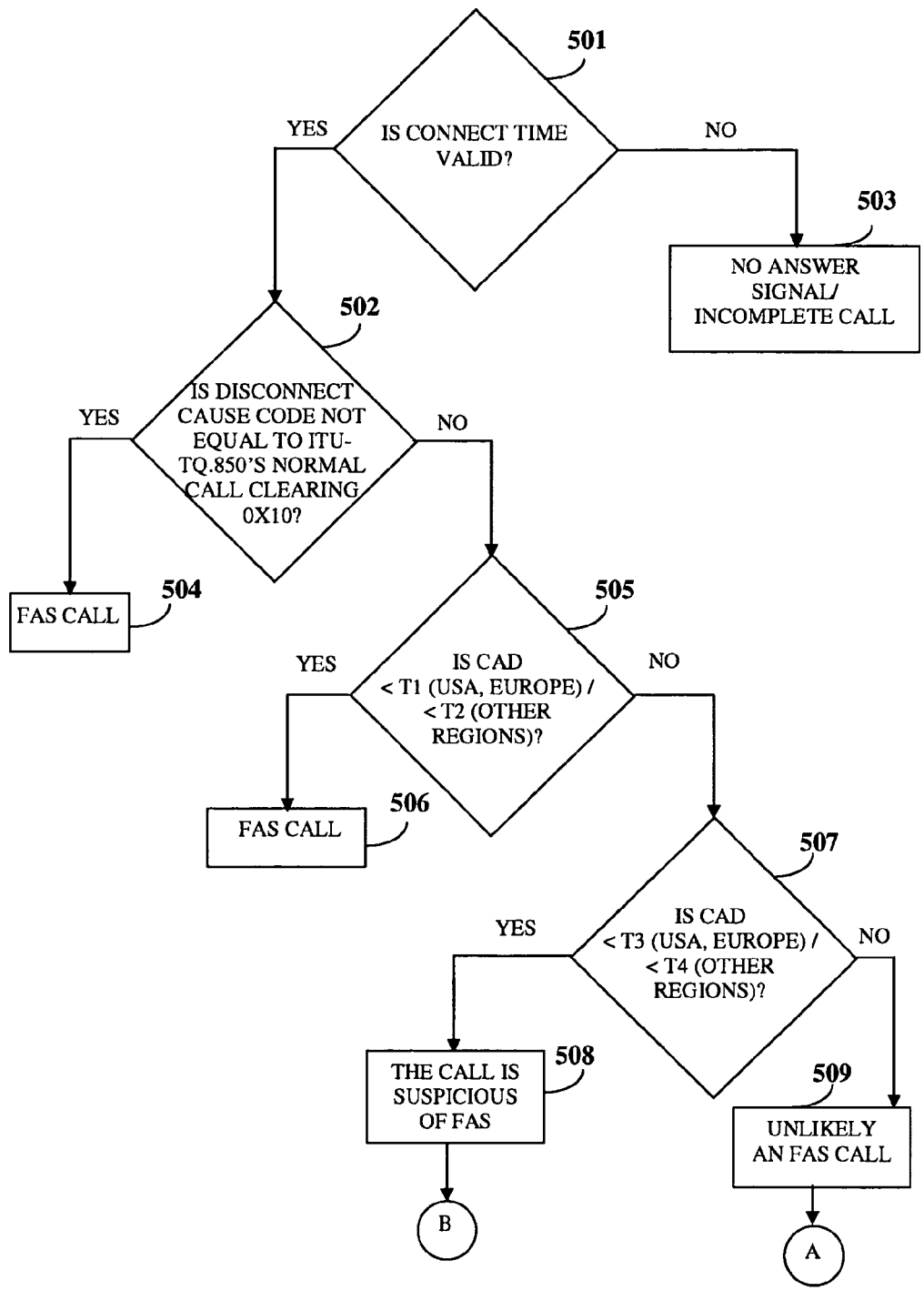
FIGS. 5A-5B exemplarily illustrate a flowchart comprising the steps for accurately detecting false answer supervision.
Figure 5B:
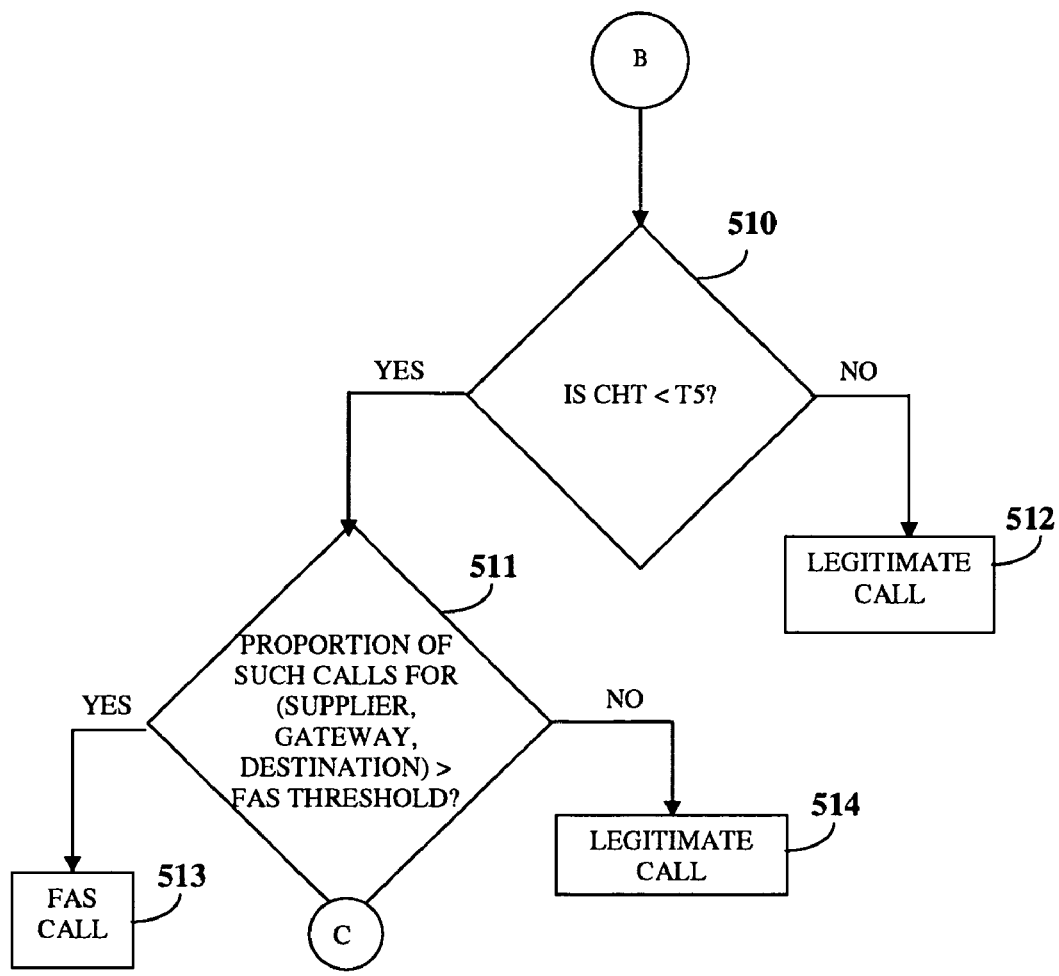

FIGS. 5A-5B exemplarily illustrate a flowchart comprising the steps for accurately detecting false answer supervision (FAS). The algorithm detects illegitimate call events, including FAS. The algorithm begins by assessing whether or not the answer signal is received 501. If there is no answer signal 503, it is considered an incomplete call. Unless the answer signal is received in a call event, the call event cannot be FAS. If the answer is received, the call event is processed through a series of tests to accurately determine if the answer signal is FAS. The call event is processed with two important considerations, namely, detecting a call that is FAS and minimizing false detection of a legitimate call as FAS.

Initial tests compares 502 the disconnect cause code for the call from the terminal gateway 204. A disconnect cause code for a call informs as to whether that call terminated normally, for example, either party went on-hook, or abnormally, for example, the call could not be setup to the called party because of one of several reasons such as called party busy, telephony network 207 out-of-order, etc. The disconnect cause codes are documented in ITU-T Q.850 standard of the telecommunication standardization sector. If the disconnect cause code is abnormal by the standard, the call is confirmed 504 as false answer supervision (FAS). An answer signal should not be transmitted for a call that did not setup successfully. The box 504 confirms that the call is FAS. Assuming that the disconnect cause code indicates "normal call clearing," code 0x10 (or decimal 16) according to ITU-T Q.850, the algorithm follows the "No" path out of the box 502 to the box 505. The algorithm at box 505 compares the call answer delay for the normal call.

Call answer delay (CAD) for a call is the interval between when the last digit is dialed to when the called party answers the call. If the value of CAD is overtly aggressive, i.e. reaches the originating gateway 203 within ring back indication threshold values T1 or T2 from call setup, even earlier than the typical minimum delay for ring back indication, the corresponding call clearly represents false answer supervision (FAS). As used herein, ring back indication threshold values, for example, T1 or T2 are based on the typical minimum delay for ring back indication for a destination. T1 or T2 is configurable, for example, typically set at 2 seconds for calls within North America and Europe, and at 2.5 seconds for other regions, respectively. T1 and T2 values are obtained after much experimentation that determines the earliest time a ring back starts to play after the last digit is dialed. If CAD<T1/T2 (T1 or T2, depending on geographical location of the destination), the call is deemed as FAS by the algorithm at box labeled 506. Else, the algorithm branches to further tests to determine whether the call is FAS. The first 2 tests involving disconnect cause code and call answer delay are restrictive and may filter a small percentage of FAS call events. These tests discover FAS easily, as depicted in boxes 504 and 506, respectively. However, in order to find a larger percentage of FAS call events, which are not usually determined in restrictive test conditions, wider test conditions are applied. The wider test conditions are applied at box labeled 507. The value of CAD is compared with a different set of configurable ring back indication threshold values T3 or T4. T3 and T4 are typically set at 3.25 seconds for calls within North America and Europe, and at 4 seconds for other regions, respectively. Since T3(T4) is greater than T1(T2), each call is tested for FAS under less restrictive conditions. In these test conditions, more calls satisfy the condition CAD<T3/T4, and hence more calls are selected to investigate 508 whether they represent FAS. If the value of CAD for a call is greater than T3/T4, the call is unlikely to be a FAS 509.

However, less restrictive conditions imply that certain selected calls may be legitimate calls and do not represent false answer supervision (FAS). For instance, auto-answering systems, such as voice mail (VM), auto attendant (AA), interactive voice response (IVR), or fax can answer calls quickly, and often satisfy the condition call answer delay (CAD)<T3/T4 (T3 or T4, depending on geographical location of the destination). The wider test conditions may therefore capture legitimate calls as well. The algorithm has to discount these falsely captured calls, and retain only those that represent FAS. These calls must not be falsely detected by the algorithm as FAS, lest the operations personnel spend numerous hours chasing down leads only to discover that the system 201 incorrectly labeled legitimate calls as FAS. The algorithm that branches along the "Yes" path from box labeled 507 has collected a majority of the FAS call events, but in the process may also have collected few legitimate calls, and must perform the onerous task of discounting the legitimate calls.

Consider a scenario where the value of AD is less than T3/T4, i.e. when the call was answered quicker than most scenarios. This may be due to the terminal gateway 204 originating a false answer, well before the called party answered, representing a case of false answer supervision (FAS). The algorithm at box 508 labels the call suspect FAS, since the algorithm has not discounted legitimate calls especially where the called party auto-answers. If the call was answered within T3/T4, depending on the configured value of T3/T4, it may be inferred that the call was answered by a human. If the call was indeed answered by a human, the ensuing conversation typically lasts long, for example, longer than T5, typically set to 60 seconds. A call hold time (CHT) is taken into account that indicates the call duration, where CHT is equal to the difference between disconnect time and connect time, and is obtained from the dial control management information base (MIB) or the mediation engine that stores call detail record. If CHT is less than T5, the conversation is short, and indicates that a human did not answer the call. Hence, the algorithm at box 510 discounts legitimate calls that may have been answered by humans at box 512. However, calls involving auto-answering systems and satisfying the condition CHT<T5 still remain. The algorithm at box 511 automatically performs the task of discounting calls involving auto-answering systems that satisfy the condition CHT<T5.

The algorithm checks 511 whether the proportion of calls with low call answer delay (CAD), i.e. CAD within T3/T4 but more than T1/T2, and low call hold time (CHT), i.e. CHT within T5, are less than a FAS threshold. The FAS threshold is the proportion of calls that are expected to have low CAD and low CHT, since many calls answered by auto-answering systems in a destination characteristically have low CAD and low CHT. If the proportion of calls with low CAD and low CHT are less than FAS threshold, then the call is legitimate 514, well within the bounds of the expected proportion of such types of calls. However, if the proportion of low CAD and low CHT calls is greater than the expected value, that is the FAS threshold, the algorithm declares 513 the calls as false answer supervision (FAS). The FAS threshold can be configured by the user or automatically learnt by the system 201 from analyzing training data, and may be different for each carrier, gateway, and destination.

Consider a scenario where the decision box 507 tested as false for the condition call answer delay (CAD)<T3/T4. This implies that the CAD was not excessively short. The terminal gateway 204 did not originate a false answer signal quickly, but waited for the called party to answer before sending an answer signal to the originating gateway 203, indicative of correct behavior. The algorithm at box 509 informs accordingly. At this point in the algorithm, the call being processed is not labeled as false answer supervision (FAS). However, the algorithm has to verify whether the call suffered from other anomalies that can make the call illegitimate. For instance, the call may have suffered from poor voice or audio quality, accentuated by inordinate delay that destroys interactiveness of voice conversation or incomprehensive voice due to choppiness as bursts of voice are interspersed with silence. At this stage the algorithm, even though complete for FAS, further investigates other anomalies as an offshoot for branching towards box 509. The completeness of the algorithm, where the algorithm investigates not only FAS but other causes for an illegitimate call such as poor voice or audio quality, sets it apart from other solutions that define and detect illegitimate calls as FAS only, ignoring poor voice or audio quality as a type of illegitimate call. The algorithm treats poor voice or audio quality as an illegitimate call.

Figure 6:
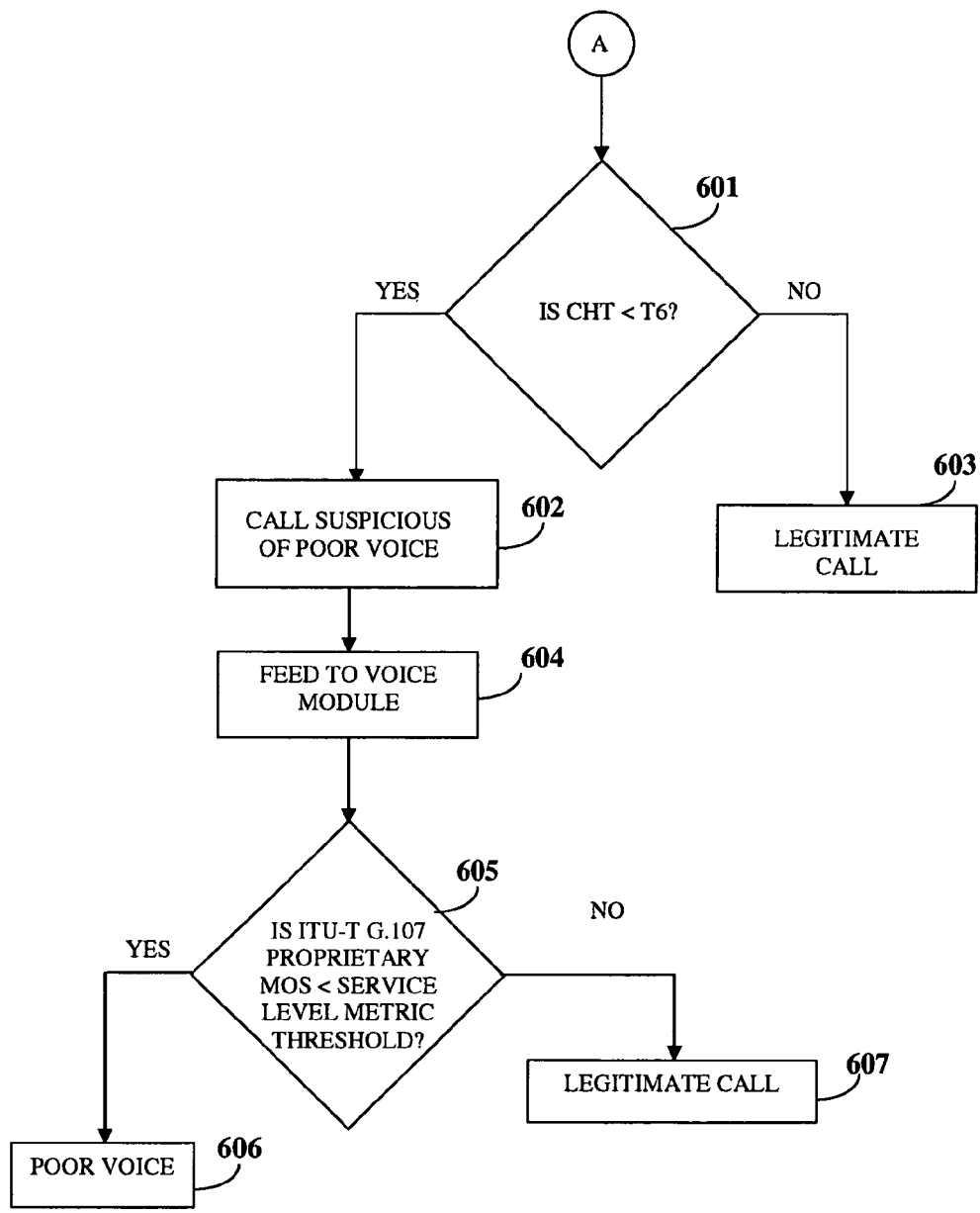
FIG. 6 exemplarily illustrates a first sub segment of the flowchart for accurately detecting false answer supervision.

FIG. 6 exemplarily illustrates a first sub segment of the flowchart for accurately detecting false answer supervision (FAS). The algorithm at box 601 checks the duration of the call by comparing the call hold time (CHT) with T6. The value of T6 is configurable, and is typically set to 60 seconds. If the condition at box 601 tests as false, the call is declared 603 legitimate. If the condition at box 601 tests as true, the call did not last long, possibly because of poor voice connection. The algorithm at box 602 informs accordingly. The algorithm verifies whether the voice or audio quality is definitively poor by feeding 604 to a voice module. The algorithm at box 605 checks the mean opinion score (MOS) for the voice. MOS provides a measure of the perceived quality of the audio for a voice conversation. If the MOS is less than the configured service level threshold for acceptable voice or audio quality, the call is declared to have poor voice or audio quality at box 606, otherwise the call is declared as a legitimate call at box 607.

Figure 7:
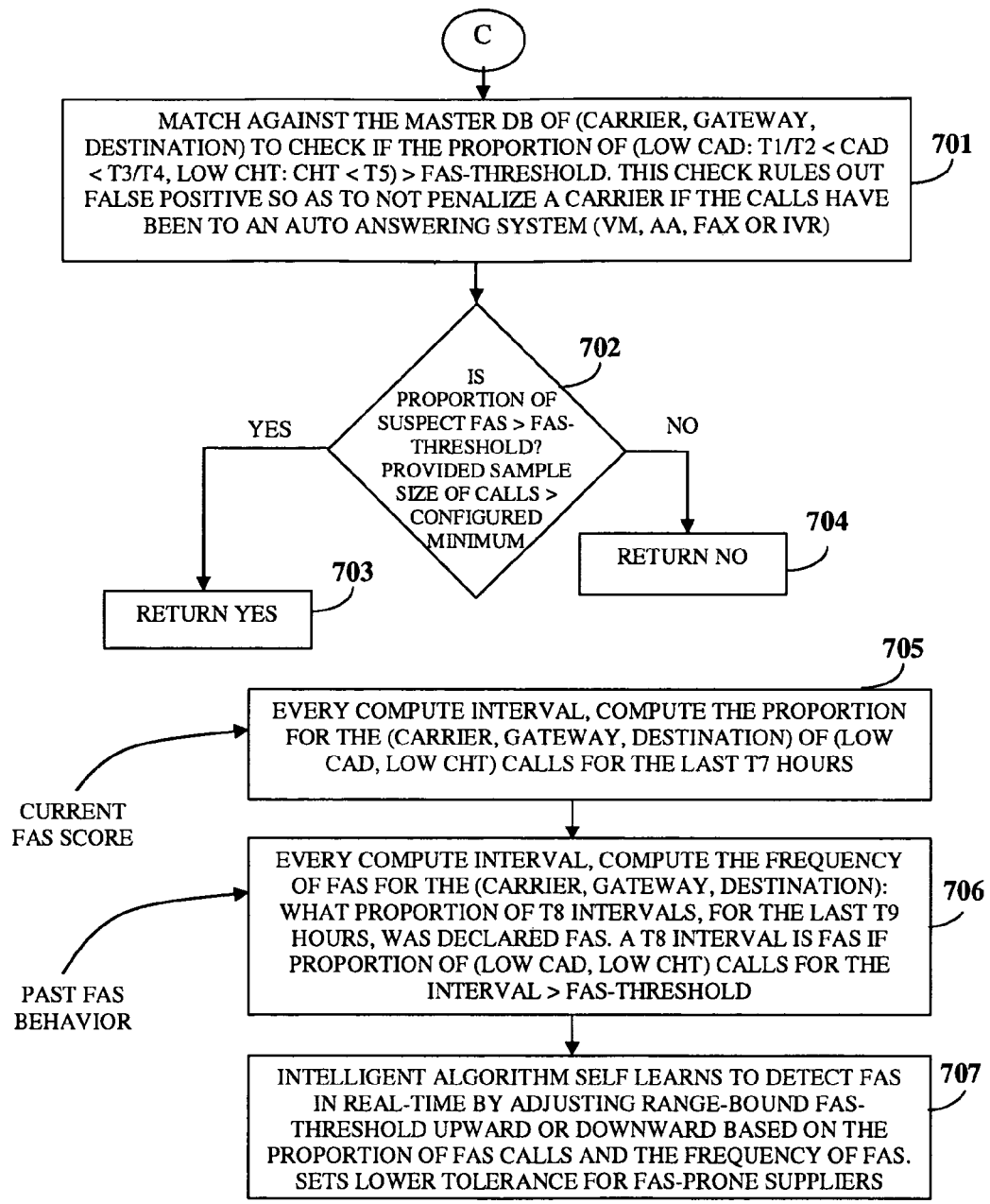
FIG. 7 exemplarily illustrates a second sub segment of the flowchart for accurately detecting false answer supervision.

FIG. 7 exemplarily illustrates a second sub segment of the flowchart for accurately detecting false answer supervision (FAS). The implementation of the algorithm at box 511 requires multiple steps as explained in the subroutine of FIG. 7, by boxes 701 through 707. The subroutine at box 701 matches against the master DB of (carrier, gateway, destination) to check if the proportion of low call answer delay (CAD) (T1(T2)<CAD<T3(T4)), and low call hold time (CHT) (CHT<T5) is less than the FAS threshold. This check rules out false positive and avoids penalizing a carrier if the calls were directed to an auto answering system. This check is important to weed out such calls for effective operation.

The subroutine at box 702 performs the check whether the proportion of calls with low call answer delay (CAD) (T1(T2)<CAD<T3(T4)) and low call hold time (CHT) (CHT<T5) is greater than the FAS threshold. If the condition at box 702 tests true, a result is returned by box 703 to the algorithm illustrated in FIG. 5B, classifying the call as false answer supervision (FAS) at box 513. Otherwise, the result is returned by box 704 to the algorithm illustrated in FIG. 5B, where the call is classified as legitimate at box 514.

The sub segment of the algorithm checks the proportion against the FAS threshold at boxes 701 and 702. FAS threshold is configured by a user based on the user's experience of the proportion of calls for a particular destination that have low call answer delay (CAD) and low call hold time (CHT), which is typical of calls to auto-answering systems. The FAS management system 201 can automatically self-learn to configure the FAS threshold by studying the proportion of low CAD and low CHT calls during a training period. However, certain carriers may be FAS-smart. A corresponding terminal gateway 204 commits false answer supervision (FAS) by exceeding the FAS threshold, and then avoids FAS by dropping below the FAS threshold, avoiding penalties. The algorithm has to detect this varying behavior. Additionally, the algorithm must accelerate the process of penalizing a FAS-prone carrier and rewarding legitimate non-FAS carriers. The accelerated process serves as a huge deterrence to carriers. The sub segment at boxes 705, 706, and 707 accelerates the process by making the FAS threshold dynamic, rather than static.

A number of predetermined compute intervals are established. At every compute interval, which is a configurable interval, the subroutine at box 705 computes the proportion of low call answer delay (CAD) and low call hold time (CHT) calls for the last T7 hours for the particular carrier-gateway-destination combination. In the current compute interval, the computed proportion is used to decide whether or not the call being investigated is false answer supervision (FAS). If this proportion is greater than the FAS threshold, all the low CAD and low CHT calls till the start of next compute interval are declared FAS.

The second sub segment of FIG. 7 tallies the current false answer supervision (FAS) score at box 705, averaged over the last T7 hours, wherein T7 is configurable. If the carrier has exhibited compliant behavior in the past, the carrier is unlikely to resort to non-compliant behavior in the present interval. The subroutine at box 706 considers the past FAS behavior. At every compute interval, the frequency of FAS for the carrier-gateway-destination combination is computed 706. For example, the frequency of FAS is the number of T8 intervals for the last T9 days that were declared FAS. Each T8 interval is declared as FAS if the proportion of (low CAD:

T1(T2)<CAD<T3(T4) and low CHT: CHT<T5) calls for that interval is greater than the FAS threshold. The intervals T8 and T9 are also configurable.

The algorithm intelligently self-learns 707 to detect false answer supervision (FAS) in real-time by adjusting range-bound FAS threshold upward or downward based on the proportion of FAS call events and the frequency of FAS. If the proportion of FAS call events and FAS frequency suggests FAS-prone behavior, the FAS threshold is decreased. This sets 707 a lower tolerance for FAS-prone carriers, and thus accelerates the process of penalizing FAS-prone carriers. The algorithm marks calls as FAS with a high degree of accuracy, avoiding false positives. The detection of FAS has value when the detection is followed by the remediation measures.

In an embodiment, the remediation measures are derived statistically, and include short term remediation measures and long term remediation measures. The short term remediation measures consider the current behavior and the past behavior of the terminal gateway 204 with regard to the false answer supervision (FAS) to penalize the service provider associated with the terminal gateway 204 for the FAS. The short term remediation measures notify or warn the service provider or carrier of an offensive behavior. For example, when illegitimate calls are detected based in excess of the service level metric, an alert is automatically sent to the service provider indicating the offense. This short term measure is popularly used for illegitimate calls due to FAS. The service provider is notified proactively in order for the service provider to rectify the behavior. In another example, a score count of FAS is kept for every service provider. This score count is sent to service provider's account payable team to ensure that billing inserts about FAS are included with the bill for false billing warnings and consequent actions. More importantly, in addition to notifications, the FAS management system 201 has the ability to auto-feed the routing engine for the carrier via the network and support systems interface 201g to remove FAS-prone routes. This penalizes the service provider or carrier of the FAS route by removing traffic, and hence business, from the carrier's terminal gateway 204. Accompanying this must be the ability to reinstate routes for carriers that have removed FAS. The FAS management system 201 can issue auto-feed to the routing engine via the network and support systems interface 201g to remove and/or reinstate the route for a carrier.

Figure 8:
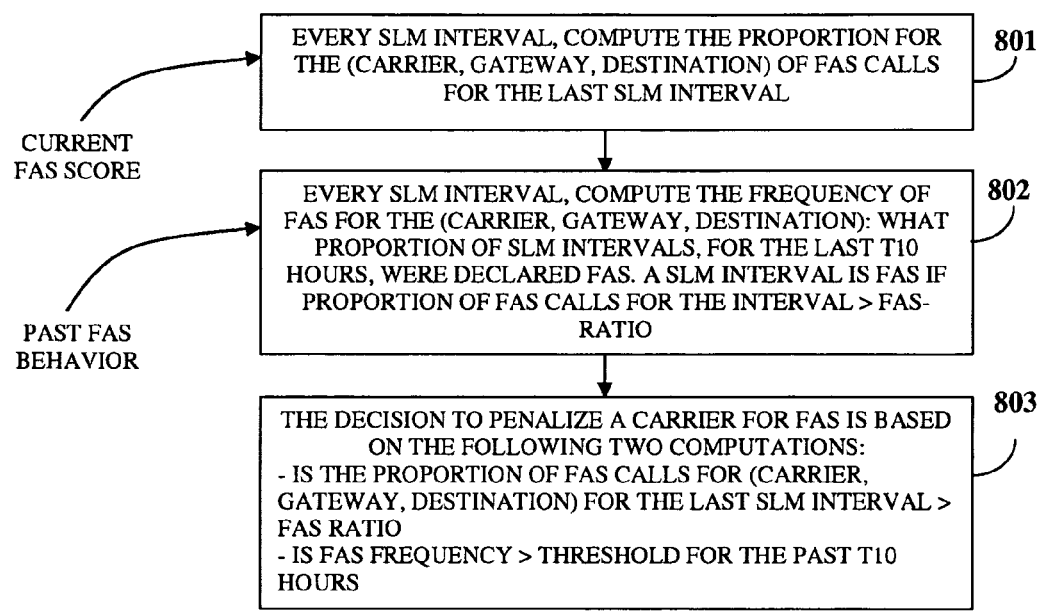
FIG. 8 illustrates decision bases for short term remediation measures for false answer supervision.

FIG. 8 illustrates decision bases for short term remediation measures for false answer supervision (FAS). The proportion of FAS call events during the last service level metric (SLM) interval is computed 801. The FAS frequency for remediation is also computed 802. The FAS frequency is the number of SLM intervals during the last T10 hours that were declared FAS. The computations are utilized to deduce 803 whether the carrier should be penalized or not. If the FAS proportion for the current SLM interval exceeds FAS-ratio and the FAS frequency for remediation exceeds a predetermined threshold, the carrier to the destination is penalized for FAS.

Long term remediation measures are used to sustain the compliant behavior of the service providers. If the customer desires, the databases can be mined to determine the regular offenders, whose gateways routinely violate the service level thresholds for false answer supervision (FAS) call events. This information can be published on the world wide web, highlighting the negligent service providers as a deterrent against non-compliant behavior. Also, the solution can be deployed for the customer, where the customer operations and billing centers use the information to manage service provider relationship. Alternately, a managed service can be established, where the service to detect illegitimate calls and maintain service provider relationship is outsourced to the managed service. Any customer can collaborate with the managed service to jointly recommend to various regulatory bodies methods to address the issues of illegitimate calls. The collaboration team can employ standards and regulatory bodies to standardize methods to detect illegitimate calls.

Figure 9:
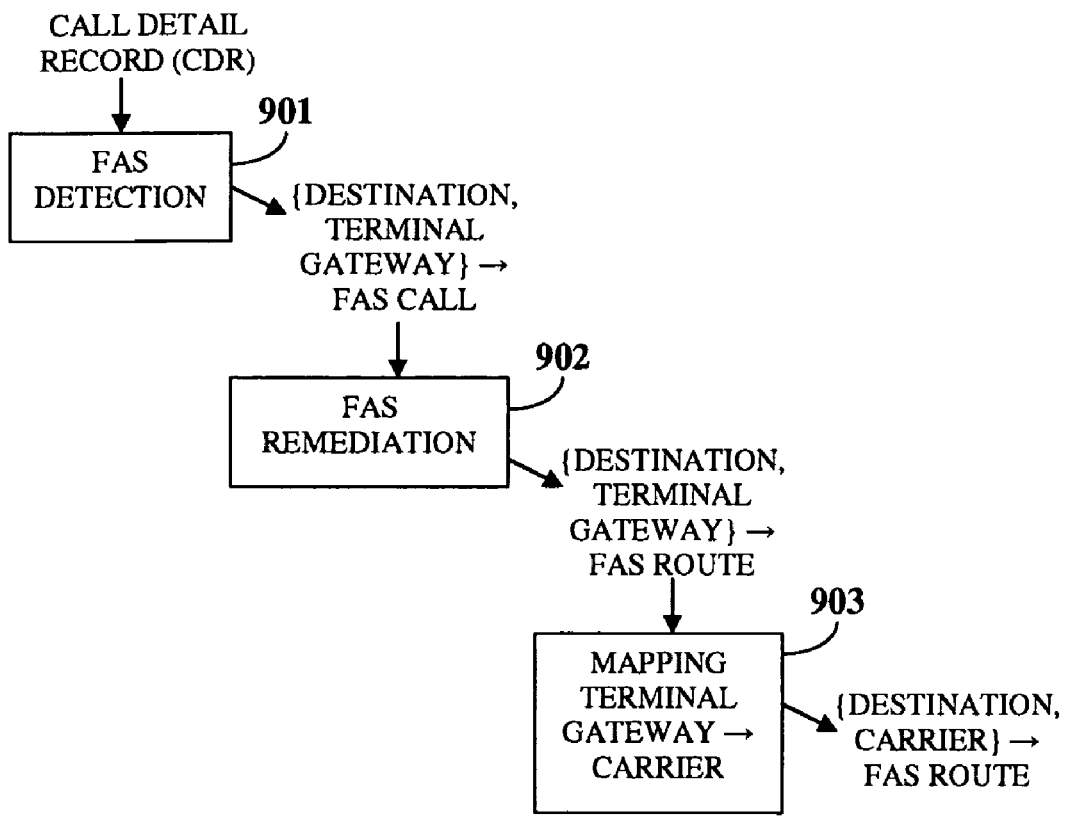
FIG. 9 illustrates the building blocks for a chaining mechanism for detecting a false answer supervision source.
Figure 10:
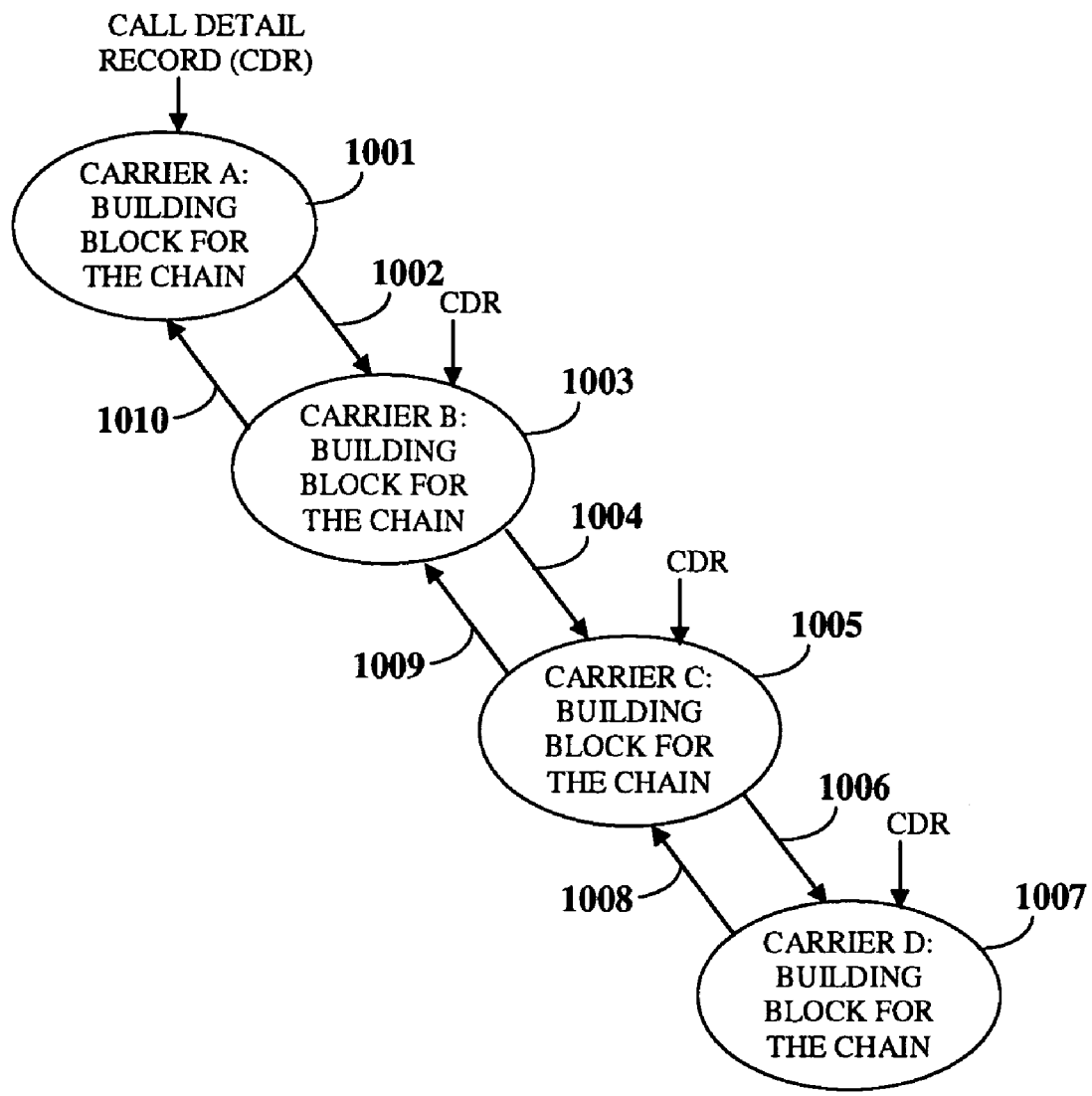
FIG. 10 illustrates the chaining mechanism for detecting the false answer supervision source based on the building blocks illustrated in FIG. 9.

In an embodiment, the FAS detection module 201a and FAS remediation module 201f are deployed for each service provider or carrier and the modules are chained to detect which carrier, amongst the multiple carriers involved in completing a call, is the source of false answer supervision (FAS). This mechanism isolates the non-compliant carrier. The carriers are required to cooperate in order to effectively remedy FAS. The carriers must remove traffic jointly from the FAS prone carrier to adversely impact the carrier's business. However, since a call typically traverses multiple carriers between the calling device 205 and the called device 206, it becomes imperative to identify the FAS prone carrier accurately for carriers to jointly penalize the offender. This is implemented as a two-step hierarchical mechanism. The first step involving the lower hierarchical layer is illustrated in FIG. 9. FIG. 9 illustrates the building blocks for a chaining mechanism for detecting FAS source. The second step involving the higher hierarchical layer is illustrated in FIG. 10. FIG. 10 illustrates the chaining mechanism for detecting FAS's source based on the building blocks illustrated in FIG. 9.

Referring to FIG. 9, the input for false answer supervision (FAS) detection is the information found in the dial control management information base (MIB) or the call detail record (CDR). The output of FAS detection 901 is records comprising destination-terminal VoIP gateway pairs for routes that commit FAS. For example, a FAS call event is detected when routing calls from any originating gateway 203 to destination via a terminal gateway 204. FAS remediation 902 identifies those route records (comprising destination-terminal VoIP gateway pairs) whose FAS exceeds the acceptable norms over service level metric (SLM) interval. The carrier that administers the terminal gateway 204 is notified of FAS violation, and possibly, penalized by removing traffic and/or withholding payment. Every gateway is administered by a carrier. The FAS prone routes (gateway-destination pair) are mapped 903 uniquely to carrier-destination pair. The carrier is responsible for FAS behavior of the terminal gateway 204 towards the destination. Referring to FIG. 10, the carrier responsible for FAS behavior to a destination is identified by executing the building blocks of FIG. 9. One instance of FIG. 9 executes at a data center for each carrier whose gateway lies along the path from the originating gateway 203 to the terminal gateway 204. Each instance of FIG. 9, executing at a carrier's data center, identifies the next carrier whose gateway may have committed FAS for a given destination. For example, the building blocks for detection, remediation, and mapping of FIG. 9 are executed at the data center for carrier A 1001, also for carrier B 1003, for carrier C 1005, and for carrier D 1007 in a chaining arrangement.

In an example, carrier A is identified as one of the carriers that routes calls to the destination that commits false answer supervision (FAS). However, while the carrier A is involved in FAS, carrier A may not be the source of the FAS. The source of FAS may be another carrier's downstream gateway. The chaining mechanism identifies the carrier that sources FAS, as the cause of FAS. The other upstream carriers merely transmit the false answer signal haplessly. In this example, carrier C's gateway is assumed to be the source of FAS, while the call originates from carrier A. The route from carrier A to destination involves carrier A routing to carrier B, carrier B routing to carrier C, and carrier C routing to carrier D. En route to carrier B, carrier A suspects 1002 whether carrier B is responsible for FAS to the destination. Carrier B, in turn, suspects 1004 whether carrier C is responsible for FAS to the destination. Finally, carrier C suspects 1006 whether carrier D, which is the last carrier en-route to the called device 206 is responsible for FAS. Each carrier on the route to the destination reports back the suspected carrier for FAS along the chain. For example, carrier B reports upstream 1010 to carrier A that carrier C is the source of FAS. Carrier C and carrier D report upstream 1009 and 1008 to carrier B and carrier C respectively when the downstream carriers report the source of FAS to them.

In the present example, carrier D is not responsible for false answer supervision (FAS). The execution of the building blocks of FIG. 9, represented as an ellipse for carrier D, determines that carrier D is not the source of FAS to the destination. Hence, carrier D reports back 1008 to carrier C accordingly. When carrier C receives this report, carrier C determines that it must be the source of FAS to the destination, since the downstream carrier D is not the source of FAS. This is communicated upstream 1009 to carrier B, and subsequently 1010 to carrier A. Carrier C is obliged to remedy FAS en-route to the destination in the carrier's gateway, irrespective of whether the carrier's gateway introduced FAS maliciously or not. Hence, the process in FIG. 9, running at each carrier as shown in FIG. 10, collectively accomplishes the task of remedying FAS by identifying the carrier responsible for FAS. If any carrier refuses to participate in chaining, the carrier is declared as the source of FAS, even if the actual source is downstream. This encourages the carriers to participate in the chaining mechanism of FIG. 10.

Consider an example for detection of false answer supervision (FAS) illustrated in FIGS. 5A, 5B, and 7. The computer implemented method and system 201 disclosed herein exemplarily investigates a FAS call event of the type illustrated in serial number "8" of FIG. 4. This call type bills the calling party even though the called party did not answer. The algorithm investigates the call at the box labeled 505 in FIG. 5A to check whether the answer signal is received in a very short time, that is, within T1 or T2. If the answer signal is received within T1 or T2, the call is declared as FAS since a call cannot be answered quicker than the ring back signal. In this example, the ring back was played out, but the call was not answered. However, if the answer signal was not received within T1 or T2, the call is further investigated at box labeled 507 in FIG. 5A. The box labeled 507 in FIG. 5A checks whether the call was answered within T3 or T4. Considering the circumstances in this example, the terminal gateway 204 sent an FAS signal within T3 or T4, and the calling party is billed maliciously. The algorithm at box labeled 507 detects that the call was indeed answered within T3 or T4.

The algorithm declares that the call under investigation is suspect of false answer supervision (FAS) at the box labeled 508 in FIG. 5A. The call is suspect of FAS, not confirmed FAS, because the algorithm has not discounted calls that are either answered manually but quickly or by auto-answering systems. The box labeled 510 in FIG. 5B weeds out the calls that are manually answered. According to this example, the call was not answered, and the calling party hung up within T5 or 60 seconds. Hence, the condition at box labeled 510 tests true, and the algorithm branches towards the box labeled 511 in FIG. 5B. The box labeled 511 in FIG. 5B weeds out the auto-answered calls. The algorithm at box labeled 511 automatically discounts auto-answered calls by comparing the proportion of low call answer delay (CAD) and low call hold time (CHT) calls to the FAS threshold. In this example, the terminal gateway 204 commits FAS, and hence the proportion is higher than FAS threshold. Therefore, the call is reasonably accurately declared as FAS. The algorithm correctly classifies calls of type depicted by serial number "8" of FIG. 4 as FAS.

Consider another example, wherein the sub segment of FIG. 7 is exemplified. The time intervals T7 and T8 are set as integral multiples of the compute interval. For example, if the compute interval is 15 minutes, T7 is set to 30 minutes and T8 is set to 15 minutes. The FAS threshold is assumed to be set at 0.13 currently. After investigation, the proportion of low call answer delay (CAD) and low call hold time (CHT) calls between 12 noon and 12:30 p.m. is determined as 0.19. Hence, as proportion of low CAD and low CHT calls>FAS threshold, the algorithm declares all the low CAD and low CHT calls processed between 12:30 p.m. to 12:45 p.m. as false answer supervision (FAS). The FAS proportion increases, presumably significantly. As a remediation measure an alert is issued because the FAS proportion is greater than the configured threshold for remediation, called FAS-ratio. FAS-ratio, for example, equals 0.09 in our example. FAS remediation penalizes carriers based on excessive FAS call events (excessive because the proportion of FAS call events exceeds the threshold referred to as FAS-ratio) for a period of time called service level metric (SLM) interval for FAS. Assuming SLM interval is equal to 1 hour, the proportion of calls during, for example, 11:35 a.m. to 12:35 p.m., exceeds the configured FAS threshold of 0.09. At 12:45 p.m., the compute interval expires, and the FAS management system 201 computes the proportion of low CAD and low CHT calls between 12:15 p.m. and 12:45 p.m. as, for example, 0.18. The FAS management system 201 also computes the interval's proportion i.e. the proportion of low CAD and low CHT calls between 12:30 p.m. and 12:45 p.m. as, for example, 0.15. This proportion of 0.15 is > the FAS threshold of 0.13. Hence, the interval between 12:30 p.m. and 12:45 p.m. is declared as an FAS interval. The FAS management system 201 further determines the change in FAS threshold as fn(0.18, FAS frequency, which is higher than earlier because the new interval has been declared FAS)=−0.03. Hence, the new value of the FAS threshold is 0.13−0.03=0.10.

The FAS threshold is equal to 0.10 currently. The proportion of low call answer delay (CAD) and low call hold time (CHT) calls between 12:15 p.m. and 12:45 p.m. is equal to 0.18. The algorithm declares all the low CAD and low CHT calls processed between 12:45 p.m. and 1:00 p.m. as false answer supervision (FAS). The FAS proportion increases, presumably significantly. At present, an alert is not issued, even when the FAS proportion is greater than the configured threshold of FAS-ratio=0.09, since the SLM interval of 1 hour expires only at 1:35 p.m. At 1:00 p.m., the compute interval expires, and the FAS management system 201 computes the proportion of low CAD and low CHT calls between 12:30 p.m. and 1:00 p.m. as, for example, 0.17. The FAS management system 201 also computes the interval's proportion i.e. the proportion of low CAD and low CHT calls between 12:45 p.m. and 1:00 p.m. as, for example, 0.13. This proportion of 0.13>the FAS threshold of 0.10. Hence the interval between 12:45 p.m. and 1:00 p.m. is declared as an FAS interval. The FAS management system 201 further determines the change in FAS threshold as fn(0.17, FAS frequency, which is higher than earlier)=−0.04. Hence, the new value of the FAS threshold is 0.10−0.04=0.06. However, the lower bound of the FAS threshold is 0.10, and thus the FAS threshold remains at 0.10.

Assuming that the carrier processes the alert issued at 12:35 p.m. by the FAS management system 201, the carrier rectifies the behavior, and prevents occurrence of false answer supervision (FAS). The FAS threshold is equal to 0.10 currently. The proportion of low call answer delay (CAD) and low call hold time (CHT) calls between 12:30 p.m. and 1:00 p.m. is equal to 0.17. The algorithm declares all the low CAD and low CHT calls processed between 1:00 p.m. and 1:15 p.m. as FAS. The FAS proportion increases, presumably significantly. At present, an alert is not issued, even when the FAS proportion is greater than the configured threshold of 0.09, since the SLM interval of 1 hour expires only at 1:35 p.m. At 1:15 p.m., the compute interval expires, and the FAS management system 201 computes the proportion of low CAD and low CHT calls between 12:45 p.m. and 1:15 p.m. as, for example, 0.09. The FAS management system 201 also computes the interval's proportion i.e. the proportion of low CAD and low CHT calls between 1:00 p.m. and 1:15 p.m. as, for example, 0.05. This proportion of 0.05<the FAS threshold of 0.10. Hence the interval between 1:00 p.m. and 1:15 p.m. is declared as a non-FAS interval. The FAS management system 201 further determines the change in FAS threshold as fn(0.09, FAS frequency, which is lower than earlier)=0.02. Hence, the new value of the FAS threshold is 0.10+0.02=0.12. As the FAS threshold has increased, the algorithms tolerance for the carrier has increased because of the carrier's compliant behavior.

For purposes of illustration, the detailed description refers to a single network node, such as the terminal gateway 204; however the scope of the method and system 201 disclosed herein is not limited to the single gateway but may be extended to include an almost unlimited number of such network nodes and multiple levels of network nodes.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method for managing false answer supervision in a telephony network, comprising the steps of:

accessing a call record comprising a plurality of call events occurring at a terminal gateway serving a called device at a destination in said telephony network;

detecting false answer supervision call events originating at said terminal gateway, comprising the steps of:

analyzing suspect illegitimate call events from said call events based on a combination of a plurality of conditions associated with call initiation, call disposition, call duration, and call billing events, wherein said suspect illegitimate call events comprise said false answer supervision call events and poor audio quality call events;

filtering said suspect illegitimate call events for detecting events suspected of said false answer supervision based on call answer delay and call hold time;

confirming said false answer supervision call events after discounting said suspected false answer supervision call events based on whether a proportion of said suspected false answer supervision call events is within a false answer supervision threshold, wherein said false answer supervision threshold is determined based on expected characteristics of said terminal gateway and said destination;

deriving a statistical inference of current behavior and past behavior of said terminal gateway for inferring non-compliant behavior of said terminal gateway over predetermined periods of time; and notifying a service provider associated with said terminal gateway of said non-compliant behavior for remedying said non-compliant behavior.

2. The computer implemented method of claim 1, wherein said step of deriving said statistical inference of said current behavior and said past behavior of said terminal gateway, comprises the steps of:

establishing threshold values for acceptable number of said false answer supervision call events over said predetermined periods of time; and inferring non-compliant behavior of said terminal gateway based on whether said false answer supervision call events over said predetermined periods of time exceed said established threshold values consistently over a predetermined duration.

3. The computer implemented method of claim 1, wherein said false answer supervision threshold is compared to a proportion of call events that are expected to have low call answer delay and low call hold time in said terminal gateway and said destination to discount said suspected false answer supervision events.

4. The computer implemented method of claim 1, wherein said call answer delay is compared with preconfigured lower values of a ring back indication threshold for detecting said suspected false answer supervision call events, wherein said call answer delay is a time interval between last digit dialed on a calling device for placing a call and said call being answered at said called device.

5. The computer implemented method of claim 4, wherein said call answer delay is evaluated against a wider test and is compared with preconfigured upper values of said ring back indication threshold for detecting said suspected false answer supervision call events.

6. The computer implemented method of claim 1, wherein said call hold time is compared with a low time value for filtering said suspect illegitimate call events answered manually but quickly, wherein said call hold time is duration of conversation between a calling party and a called party.

7. The computer implemented method of claim 1, wherein said remedying of said non-compliant behavior comprises short term remediation measures, wherein said short term remediation measures considers said current behavior and said past behavior of said terminal gateway with regard to said false answer supervision to penalize said service provider associated with said terminal gateway for said false answer supervision.

8. The computer implemented method of claim 1, further comprising the step of computing said proportion of said suspected false answer supervision call events over a plurality of predetermined compute intervals.

9. The computer implemented method of claim 8, further comprising the step of computing frequency of said false answer supervision over said predetermined periods of time for said predetermined duration, wherein said predetermined periods of time correspond to said predetermined compute intervals.

10. The computer implemented method of claim 1, further comprising the step of declaring said poor audio quality call events based on said call hold time and a mean opinion score for said suspect illegitimate call events.

11. The computer implemented method of claim 1, wherein said remedying of said non-compliant behavior comprises long term remediation measures for sustaining compliant behavior of said service provider.

12. The computer implemented method of claim 1, further comprising the step of chaining said detection and said remediation across service providers to isolate said terminal gateway of said service provider that originates said false answer supervision.

13. A computer implemented system for managing false answer supervision in a telephony network, comprising:

a network and support systems interface for accessing a call record comprising a plurality of call events occurring at a terminal gateway serving a called device at a destination in said telephony network, wherein said network and support systems interface returns remediation events to one of said telephony network and support systems for routing for remedying non-compliant behavior;

a false answer supervision detection module for detecting false answer supervision call events originating at said terminal gateway, comprising:

an illegitimate event analysis module for analyzing suspect illegitimate call events from said call events based on a combination of a plurality of conditions associated with call initiation, call disposition, call duration, and call billing events, wherein said suspect illegitimate call events comprise said false answer supervision call events and poor audio quality call events;

a false answer supervision filter for filtering said suspect illegitimate call events for detecting events suspected of said false answer supervision based on call answer delay and call hold time;

a discounting module for discounting said suspected false answer supervision call events based on whether a proportion of said suspected false answer supervision call events is within a false answer supervision threshold, wherein said false answer supervision threshold is determined based on expected characteristics of said terminal gateway and said destination;

a false answer supervision inference module for deriving a statistical inference of current behavior and past behavior of said terminal gateway over predetermined periods of time, wherein said false answer supervision inference module establishes threshold values for acceptable number of said false answer supervision call events over said predetermined periods of time; and a false answer supervision remediation module for inferring non-compliant behavior of said terminal gateway based on whether said false answer supervision call events over said predetermined periods of service level metrics time exceed said established threshold values consistently over a predetermined duration, wherein said false answer supervision remediation module notifies and removes from route a service provider associated with said terminal gateway of non-compliant behavior for remedying said non-compliant behavior and implementing remediation measures.

14. The computer implemented system of claim 13, wherein said discounting module establishes said false answer supervision threshold for comparing a proportion of call events that are expected to have low call answer delay and low call hold time in said terminal gateway and said destination to discount said suspected false answer supervision events.

15. The computer implemented system of claim 13, wherein said false answer supervision detection module compares said call answer delay with preconfigured lower values of a ring back indication threshold for detecting said suspected false answer supervision call events, wherein said call answer delay is a time interval between last digit dialed on a calling device for placing a call and said call being answered at said called device.

16. The computer implemented system of claim 15, wherein said false answer supervision detection module evaluates said call answer delay against a wider test by comparing said call answer delay with preconfigured upper values of said ring back indication threshold for detecting said suspected false answer supervision call events.

17. The computer implemented system of claim 13, wherein said false answer supervision detection module compares said call hold time with a low time value for filtering said suspect illegitimate call events answered manually but quickly, wherein said call hold time is duration of conversation between a calling party and a called party.

18. The computer implemented system of claim 13, wherein said false answer supervision detection module computes said proportion of said suspected false answer supervision call events over a plurality of predetermined compute intervals.

19. The computer implemented system of claim 18, wherein said false answer supervision detection module computes frequency of said false answer supervision over said predetermined periods of time for said predetermined duration, wherein said predetermined periods of time correspond to said predetermined compute intervals.

20. The computer implemented system of claim 13, wherein said false answer supervision detection module declares poor audio quality call events based on said call hold time and a mean opinion score for said suspect illegitimate call events.

21. The computer implemented system of claim 13, further comprising chaining said detection and said remediation across service providers to isolate said terminal gateway of said service provider that originates said false answer supervision.

22. A computer program product comprising computer executable instructions embodied in a computer-readable medium, wherein said computer program product comprises:

a first computer parsable program code for accessing a call record comprising a plurality of call events occurring at a terminal gateway serving a called device at a destination in a telephony network;

a second computer parsable program code for detecting false answer supervision call events originating at said terminal gateway, wherein said second computer parsable program code comprises:

a third computer parsable program code for analyzing suspect illegitimate call events from said call events based on a combination of a plurality of conditions;

a fourth computer parsable program code for filtering said suspect illegitimate call events for detecting events suspected of said false answer supervision based on call answer delay and call hold time; and a fifth computer parsable program code for confirming said false answer supervision call events after discounting said suspected false answer supervision call events based on whether a proportion of said suspected false answer supervision call events is within a false answer supervision threshold;

a sixth computer parsable program code for deriving a statistical inference of current behavior and past behavior of said terminal gateway over predetermined periods of time, wherein said sixth computer parsable program code comprises:

a seventh computer parsable program code for establishing threshold values for acceptable number of said false answer supervision call events over said predetermined periods of time;

an eighth computer parsable program code for inferring non-compliant behavior of said terminal gateway based on whether said false answer supervision call events over said predetermined periods of time exceed said established threshold values consistently over a predetermined duration; and a ninth computer parsable program code for notifying a service provider associated with said terminal gateway of said non-compliant behavior for remedying said non-compliant behavior and implementing remediation measures.

* * * * *